United States Patent [19]
Corporon et al.

[11] Patent Number: 6,088,918
[45] Date of Patent: Jul. 18, 2000

[54] CLOSED LOOP VEHICLE FRAME STRUCTURE FOR LATERALLY SPACED SUSPENSION COMPONENTS

[75] Inventors: Max A. Corporon, Bloomfield Hills; Norman B. Robbins, Davison; Nagesh A. Basavanahalli, West Bloomfield, all of Mich.

[73] Assignee: Chrysler Corporation, Auburn Hills, Mich.

[21] Appl. No.: 09/251,251

[22] Filed: Feb. 16, 1999

Related U.S. Application Data

[62] Division of application No. 08/937,780, Sep. 25, 1997.

[51] Int. Cl.[7] .................................................... B21D 53/88
[52] U.S. Cl. ............................ 29/897.2; 29/469; 296/195
[58] Field of Search .................................. 29/897.2, 469; 296/195, 203.04, 198

[56] References Cited

U.S. PATENT DOCUMENTS

| | | | |
|---|---|---|---|
| 4,408,794 | 10/1983 | Harasaki | 296/198 |
| 4,950,025 | 8/1990 | Yoshii | 296/195 |
| 5,102,186 | 4/1992 | Yoshii et al. | 296/195 |
| 5,110,177 | 5/1992 | Akio | 296/195 |
| 5,123,696 | 6/1992 | Watari | 296/195 |
| 5,350,214 | 9/1994 | Yamauchi et al. | 296/195 |
| 5,788,322 | 8/1998 | Wolf et al. | 296/203.04 |

FOREIGN PATENT DOCUMENTS

| | | | |
|---|---|---|---|
| 5-139337 | 6/1993 | Japan | 296/203.04 |
| 5-213234 | 8/1993 | Japan | 296/195 |

*Primary Examiner*—Irene Cuda
*Assistant Examiner*—Trinh T. Nguyen
*Attorney, Agent, or Firm*—Kenneth H. Maclean

[57] ABSTRACT

A framing structure for the rear portion of an automotive, including a pair of spaced and generally vertically oriented suspension strut towers each tower fixed at lower and upper end portions to a lower cross beam and an upper cross beam respectively and with each cross beam extending the full width of the vehicle and with each beam having a closed cross-sectional configuration to providing a high degree of structural rigidity as a mounting platform for the left and right rear wheel suspensions. A yoke-like structure on the upper ends of each suspension strut tower supports an end portion of the upper cross beam, each yoke including a pair of spaced side walls between which an end portion of the beam extends so that in vehicle assembly the beam's end portions are positioned or floated in a respective yoke in sliding engagement between the spaced side walls which permits independent lateral shifting of the upper end portion of each strut tower into desired alignment with the vehicle and with one another. Subsequently, the overlying side walls of the strut towers are attached to the end portions of the cross beam by a plurality of widely spaced spot welds thus providing a high degree of rigidity and accuracy to the framing structure.

5 Claims, 5 Drawing Sheets

CLOSED LOOP VEHICLE FRAME STRUCTURE FOR LATERALLY SPACED SUSPENSION COMPONENTS

CROSS-REFERENCES TO RELATED APPLICATIONS

This application is a division of pending application Ser. No. 08/937,780, filed Sep. 25, 1997 by the same inventors as in the present application.

BACKGROUND OF THE INVENTION

1. Field of the Invention

This invention concerns vehicle framework, and more particularly, to an improved rear frame structure for an automobile which incorporates a pair of vertically oriented strut towers and a pair of laterally extending cross beam assemblies for supporting rear suspension components wherein a high degree of accuracy in spacing and alignment of the strut tower results to very accurately position associated suspension assemblies including springs and shock absorbers. This reduces vibration and noise transmission from the suspension components to the vehicle structure during operation of the vehicle due to the significant increase in strengthening.

2. Description of Related Art

Prior to the present invention various reinforced rear frame structures and strut mountings have been designed to operatively mount the rear suspension components with the object of providing a comfortable ride and increased storage space within the vehicle body in the form of an enlarged luggage/cargo space.

For example, U.S. Pat. No. 4,408,794, for "Support Column for Automotive Vehicle Wheel Suspension Assembly", issued Oct. 11, 1983, discloses a rear frame structure with support columns or suspension strut towers that are connected at an upper end by a thin-walled upper rear shelf panel and at a lower end by a substantially flat floor panel. With this construction, the suspension strut towers are designed to support rear wheel suspension components but are not readily adjustable relative to any supports for establishing a high degree of accuracy in spacing or parallelism.

In U.S. Pat. No. 5,350,214, for "Rear Body Structure for Automotive Vehicle", issued Sep. 27, 1994, opposing suspension strut towers are connected at their lower ends to special gusset constructions which are in turn connected to a floor cross member and are connected at their upper ends by gussets which are in turn connected to a panel-like rear shelve tray, thereby requiring additional means to stiffen the corners of a pass-through structure which reduces the opening size and the utility of the pass-through feature.

In U.S. Pat. No. 4,950,025, issued Aug. 21, 1990 for "Automobile Rear Body Structure" a rear deck, fenders, inner panels and rear wheel houses are joined to form a compartment for receiving external forces such as from road shock imparted through the rear wheel suspension struts.

In U.S. Pat. No. 5,660,415, issued Aug. 26, 1997 for "Torque Box Assembly for a Vehicle", a torque box for mounting a rear suspension trailing link is shown attached to a vehicle frame side rail and a body side rail for receiving external forces such as from road shock imparted through the rear wheel suspension.

In U.S. patent application Ser. No. 08/678,285, filed Jul. 11, 1996, entitled "Bracket With Floating Tap Plate for Connecting Vehicle Suspension to Body" a fastener for attaching a portion of a vehicle suspension to a vehicle body is disclosed.

While the framing arrangements disclosed in these prior patents provide various constructions and improvements to the vehicle body structures, they incorporate additional parts, assembly operations, and expense to achieve any degree of accuracy to provide a stable suspension strut platform for mounting suspension components, all of which contribute to improved passenger comfort and ride quality for occupants of a vehicle. More particularly, the prior constructions do not provide modern standards of body stiffness without added reenforcing components and the like such as reenforcements at joints. Resultantly, the suspension springs and shock absorbers cannot operate with high efficiency to better isolate the vehicle body from road induced vibrations. In contrast, this invention's frame structure produces a high degree of frame rigidity and a substantial reduction in the transmittal of vibrational energy into the vehicle body from the suspension, all without adding parts and increasing weight.

SUMMARY OF THE INVENTION

The subject invention provides an improved rear framing structure for an automotive vehicle incorporating a pair of suspension strut towers with an upper and a lower cross beam. Each cross beam has a substantially closed structure when looked at in cross-section which provides great rigidity. The cross beams extend between the pair of laterally spaced suspension strut towers and are rigidly attached thereto after the towers are correctly aligned in vertical orientation and in parallelism to one another. This greatly enhances the structural rigidity of both the strut towers and the whole rear frame portion of the vehicle.

The upper cross beam is a unitary member which extends completely across the vehicle in the lateral direction between a pair of laterally spaced suspension strut towers used for supporting suspension components for left and right rear wheels. The upper cross beam has a closed construction when viewed in cross-section which imparts great rigidity. Opposite end portions of the upper cross beam are attached to the upper portions of the suspension strut towers. Specifically, the upper end of each strut tower defines a yoke-like configuration defined mainly by a pair of spaced side walls of the associated strut tower. An end portion of the cross beam is cradled in each yoke between the spaced side walls. In assembly of the vehicle, the ends of the cross beam are nestled in or floated in the yoke portions with sliding permitted between the spaced side walls and a respective end of the beam. This allows the upper portion of each strut tower to be moved into desired alignment with the vehicle and with respect to the other strut tower for establishing substantial parallelism. Subsequently, the overlying side walls of each strut tower is attached to an adjacent end portion of the upper cross beam preferably by a plurality of widely spaced spot welds so that the framing structure is rigidly interconnected and the strut towers are accurately positioned for good.

Another feature of this invention is to provide an improved "closed loop" framing structure for a vehicle that defines supports for rear suspension components such as springs and shock absorbers and utilizes rigid upper and lower cross beams to accurately position the spaced pair of strut towers. The framing structure also has a lower cross beam which is cooperative with the vehicle's floor pan to which it is welded and is a substantially closed structure when viewed in cross-section. At each end of the cross beam, a side frame rail is attached to the cross beam and to the suspension strut towers. Each side rail also extends forward from the strut tower to establish a solid attachment base for a forward pivot attachment of a longitudinal location link member of the rear suspension structure.

This invention's closed loop vehicle framing structure effectively counters bending moments imparted through the strut towers. The rigidity of the resultant structure permits the suspension components to more effectively operate in dissipating or converting energy imparted from road irregularities which tend to induce vibrations which otherwise would travel into the vehicle passenger compartment. More particularly, the closed loop support system of this invention completes an internal load path extending around the closed perimeter of the framing structure so that the suspension mounting points are sufficiently stiff wherein road induced vibrations are substantially dissipated by the suspension. Accordingly, this invention minimizes transmittal of vibration and noise into the interior compartments of the vehicle.

The above described framing structure for mounting suspension components allows the spring and associated shock absorber to function with greater efficiency so that substantially increased levels of vibrations and noise are desirably dissipated and do not adversely affect occupants or equipment in the associated vehicle.

This invention also readily adapts to the addition of a pass-through feature between the rear of the passenger compartment and the luggage/cargo space or trunk. Thus, a fold-down trunk access panel or the like can be incorporated so that elongated objects such as skis can be extended from the trunk into the passenger compartment and transported within the vehicle. Prior vehicle rear framing includes a relatively continuous body structure behind the rear seat back which prevents addition of an effective pass-through structure. The previous trunk blocking structure is eliminated with the provision of the improved closed loop framing structure which even more importantly also provides increased structural rigidity that improves the support of the back of the rear seat of the vehicle as well as the suspension components.

More particularly, the closed loop framing structure of this invention provides a maximized rectangular pass-through opening through the rear seat back area that connects the passenger compartment with the trunk of the vehicle. The maximum width of the pass-through opening is generally limited by the space between the suspension strut towers. The pass-through opening is framed at the top by the upper cross beam including a generally U-shaped member and a shelf forming panel member which are welded together to provide the rigid closed structure as viewed in cross-section. Each end of this rigid upper cross beam is attached to a yoke portion carried at the upper end portion of a suspension strut tower. The pass-through opening is further defined at its lower edge by the floor panel which is welded to a generally U-shaped lower cross beam to form a rigid closed structure as viewed in cross-section. Each end of the lower beam is attached to a strut tower and to a side rail member each of which extend fore and aft or longitudinally of the vehicle. A forward end of each side rail provides a base for pivotal attachment of a rear suspension longitudinal location link.

By attachment of accurately aligned strut towers to the upper and lower cross beams, a generally ring-shaped or closed loop framing structure is provided which is extremely rigid. This construction also allows the two suspension strut towers to be very accurately positioned with respect to each other and with respect to the beam members. A framing structure is created that is sufficiently rigid to effectively support suspension components wherein a very effective and improved operation of the suspension springs and shock absorbers dissipates road vibrations and any transmission of vibrations and noise into the interior compartments of the vehicle are greatly reduced.

These and other features, objects and advantages of this invention will become more apparent from the following detailed description of an embodiment, reference hereby being made to drawings of the embodiment as follows:

DETAILED DESCRIPTION OF THE DRAWINGS

Figure 1:
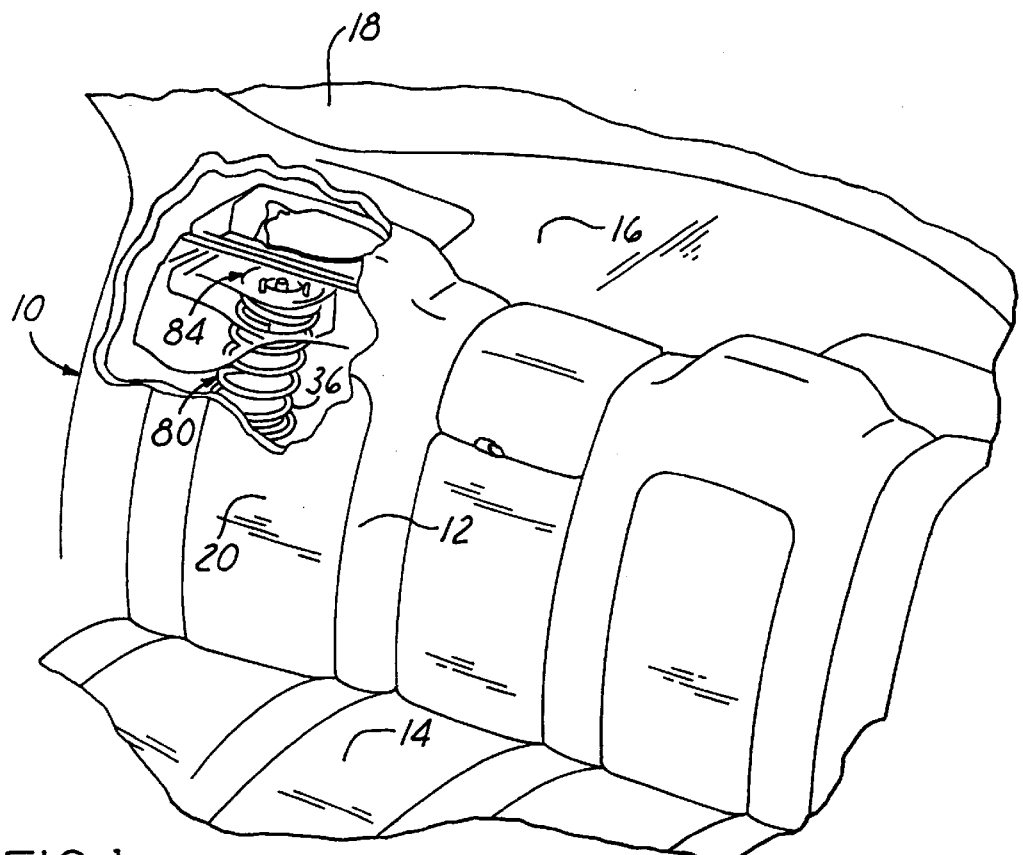
FIG. 1 is a pictorial view of the rear seat area of an automotive vehicle passenger compartment with parts broken away.
Figure 2:
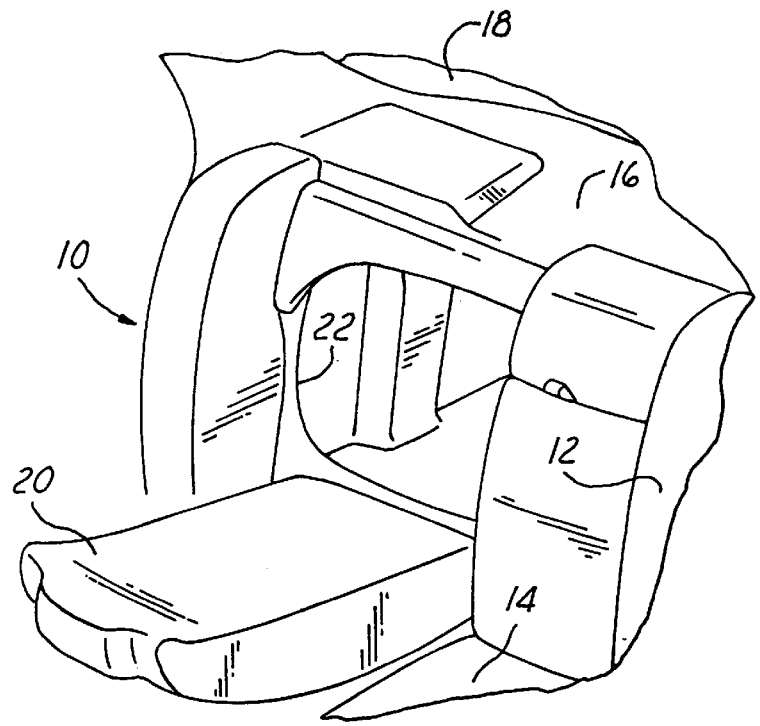
FIG. 2 is a pictorial view similar to Fig. 1 showing a pivotal fold-down seat portion in an opened position to provide pass-through access to the vehicle trunk.

Turning now in greater detail to the drawings, FIG. 1 shows a portion of the interior of an automotive vehicle and more particularly the rear seating area 10 having a seat assembly including a seat back 12 and seat cushion 14. Above and to the rear of the vehicle is a generally horizontal panel 16 at the base of a rear window or back light 18. As previously mentioned, the subject framing system allows for a pass-through feature from the passenger compartment to the trunk. In this regard, a portion 20 of the seat back is mounted for pivotal movement from a closed position shown in FIG. 1 to an opened position shown in FIG. 2. In the opened position, the pivotal portion 20 moves out of the way to uncover an access opening 22 which extends or opens into the trunk. The pivotal portion 20 can be selectively opened and folded down for communication between the vehicle trunk and the passenger compartment so that long objects such as skis, can be easily loaded and carried in the vehicle.

Figure 3:
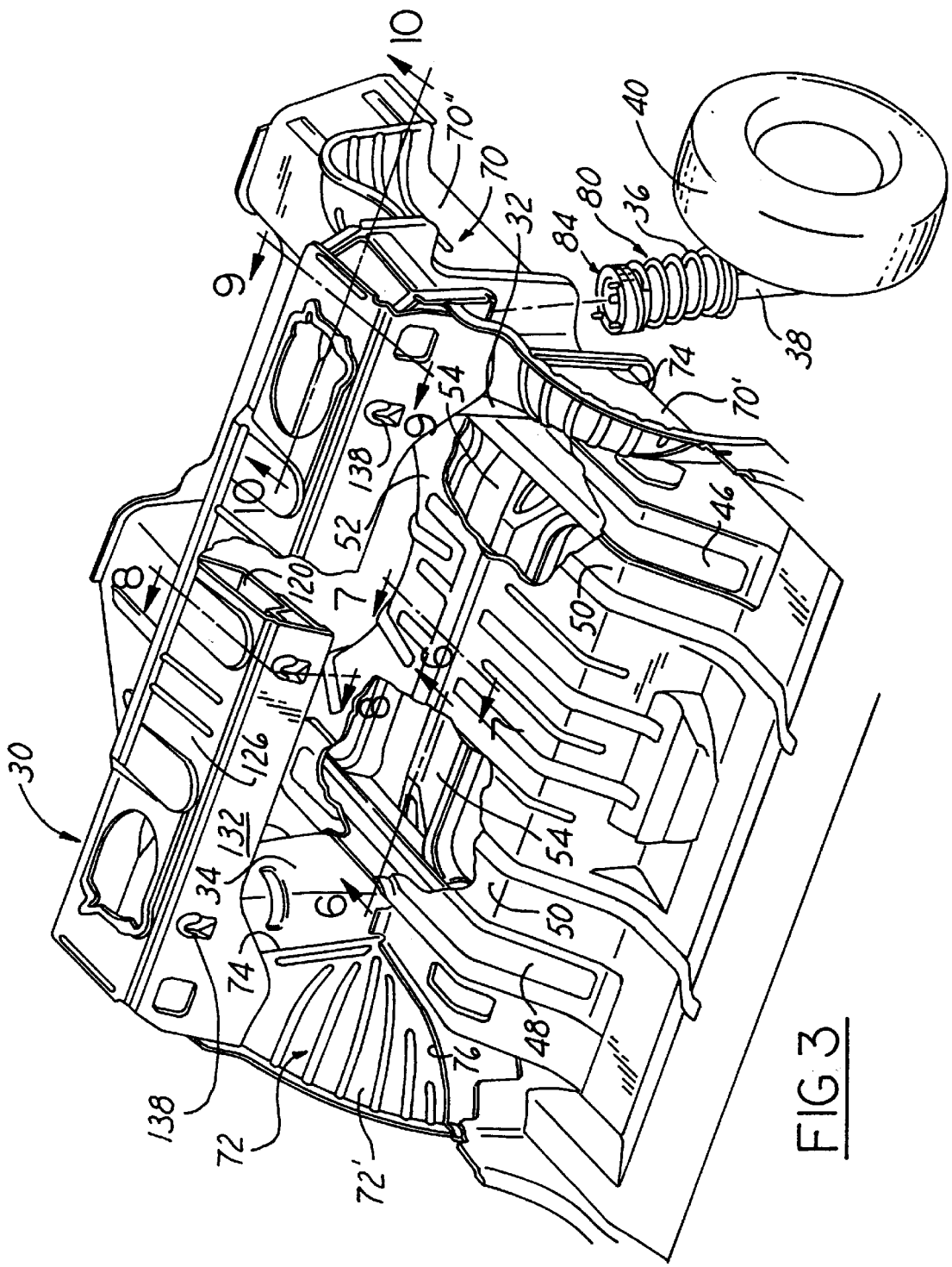
FIG. 3 is a pictorial view of the subject rear framing structure of an automotive vehicle with parts broken away and looking from the passenger compartment.
Figure 4:
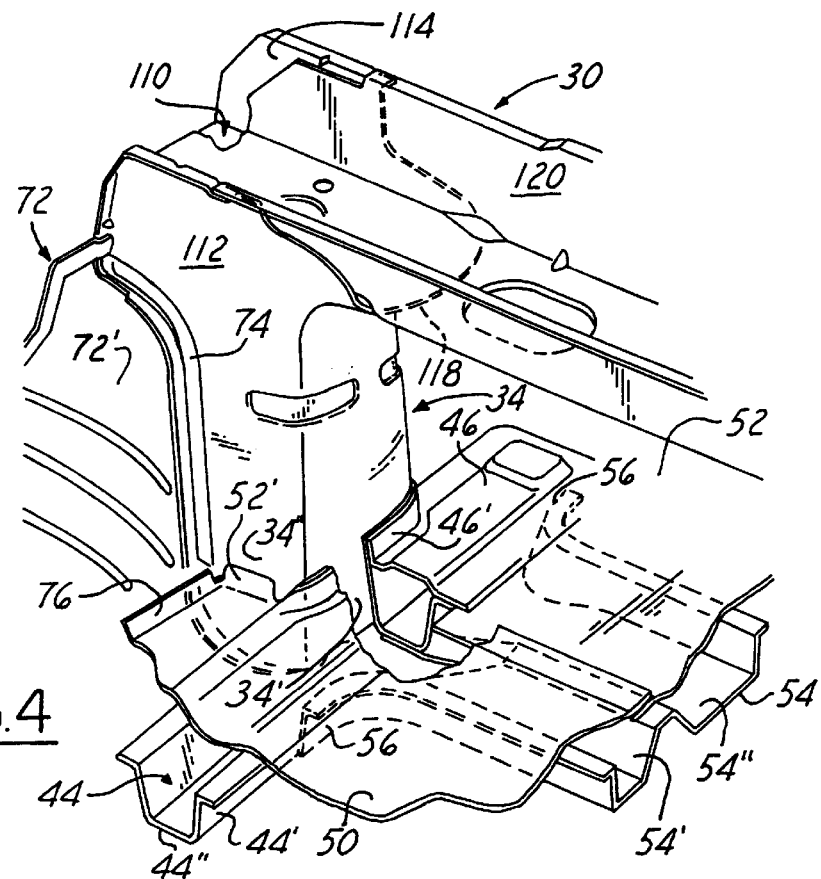
FIG. 4 is an enlarged view of a portion of the rear framing structure shown in FIG. 3 with parts broken away and looking from the passenger compartment.
Figure 5:
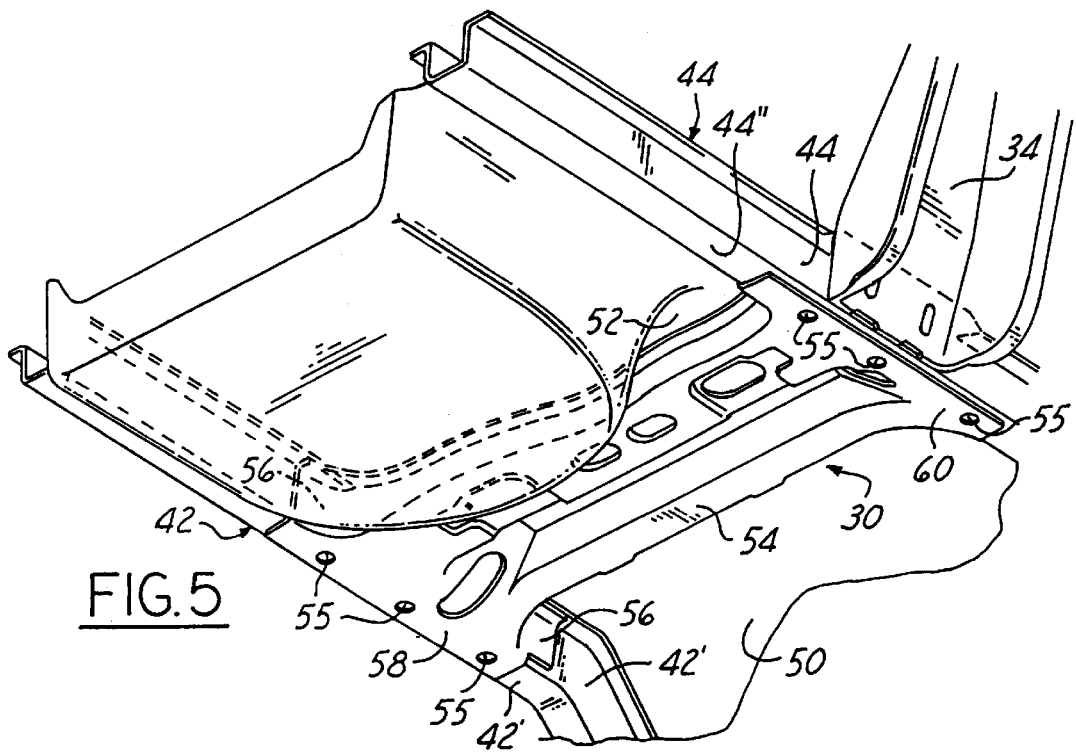
FIG. 5 is a pictorial bottom view of the lower cross beam of the subject rear framing structure of FIG. 2 looking forward from the rear cargo compartment or trunk area.

FIGS. 3, 4 and 5 best show the closed loop type rear framing structure 30 used in the subject vehicle for the purpose of providing a rigid support for the rear suspension components and also for supporting the seat back 12 and related structures shown in FIG. 1. As will be further described, this construction makes possible the provision for an unobstructed pass-through opening from the rear seat area into the trunk. But even more importantly, the subject framing structure provides a higher degree of rigidity and beam strength as compared to previous vehicle structures. This is significant because the rear framing structure includes and strengthens a pair of laterally spaced left (driver's side) and right (passenger side) suspension strut towers 32 and 34. Each of these strut towers 32, 34 are the primary support for a rear suspension assembly including a spring 36 and a shock absorber 38 which support a vehicle wheel 40 and directly receive road induced vibrations and noise therefrom.

Figure 6:
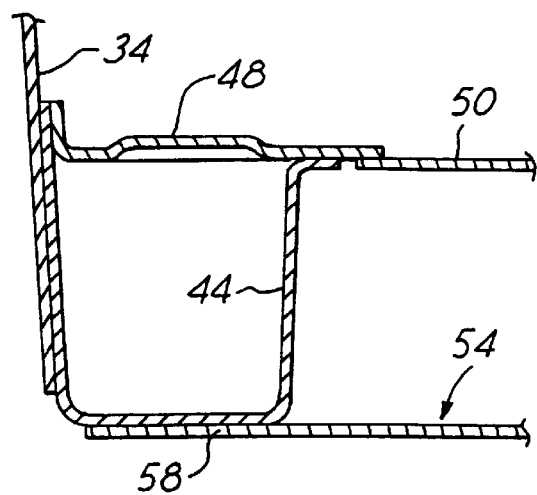
FIG. 6 is a cross sectional view taken along sight lines 6—6 in FIG. 3.

More particularly, the closed loop framing structure 30 of this invention incorporates the previously identified pair of laterally spaced suspension strut towers 32 and 34 and a left and a right side rail member 42, 44 as best seen in FIGS. 4 and 5. Each of the strut towers 32, 34 are welded to a side rail 42 and 44 respectively. The side rails 42, 44 extend longitudinally with respect to the vehicle and have a generally U-shape in cross section as best seen in FIGS. 4 and 5. To each of the side rails 42, 44, an elongated sheet metal cap member 46, 48 is secured respectively as shown in FIGS. 3 and 6. Specifically, each cap member 46, 48 covers an open top portion of the associated side rail 42, 44 with edge portions of the covers welded to the upper edge portions of the side rails to form a closed box-like structure as viewed in cross-section in FIG. 6. Cap members 46, 48 are substantially planar with the vehicle passenger compartment floor pan 50 and with the vehicle trunk floor pan 52. Cap members 46, 48 generally follow the path of the upper edges of the associated side rail member in the vehicle's longitudinal direction from a forward area in the passenger compartment to a more rearward area in the trunk compartment. The forward most portion of each rail member 42, 44 forms a support for a forward end of a trailing arm member (not shown) of the suspension. In this regard, reference is made to the previously described U.S. Pat. No. 5,660,415 to Redman et al. The trailing arm member establishes the longitudinal positioning of an associated wheel and its other suspension components.

An elongated suspension carrier assembly (not shown) for supporting rear suspension components for each of the rear wheels is attached to end portions of an elongated cross member or support (not shown) which is adapted to extend along and directly below a rear cross beam member 54 shown in FIG. 5. Each opposite end portions of the elongated suspension carrier assembly is adapted to be fastened by bolts to the side rail member 42, 44 and ends of the rear cross beam member 54. For receiving this bolted connection, apertured mounting points 55 are identified in FIG. 5. Specifically, these mounting points 55 consist of openings through the ends of the cross beam 54 and side rails 42, 44 and brackets with floating tap plates (not shown) within the side rails as per the above identified U.S. application Ser. No. 08/678,285. This construction and connecting arrangement provides a very stiff and strong structure for the side rails and the suspension carrier assembly.

Figure 7:
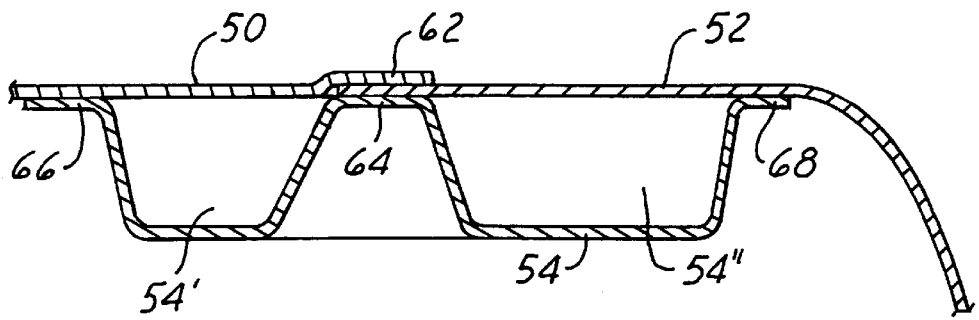
FIG. 7 is a cross sectional view taken along sight lines 7—7 of FIG. 3.

As seen in FIGS. 3 and 5, a lower cross beam member 54 extends laterally across the vehicle between the side rails 42, 44 and the two strut towers 32, 34. This cross beam 54 has a substantially W-shaped configuration as seen in FIG. 7. Specifically, the cross member 54 extends beneath the floor pan 50 and trunk floor 52 and is attached thereto by welds. In FIG. 7, it can be seen that the combination of members 50, 52, and 54 form a closed structure in cross section and define a pair of channels 54' and 54". As best seen in FIG. 4, a side edge portion 56 of the lower cross beam 52 is secured to the side wall 44' of rail member 44 by welds. At the opposite end of the cross beam 54, similar side edge portion are also welded to the other side wall of the rail member 42. In addition, as seen in FIG. 5, the bottom end portions 58, 60 of cross member 54 are extended over the corresponding bottom surfaces 42", 44" of each rail member 42, 44 and welded thereto.

As illustrated in FIG. 4, a lower end portion 34' of the strut tower 34 overlies the side wall 44' of rail member 44 and is welded thereto. Further, the edge 46' of the cap member 46 covers a portion of side wall 44' and is welded thereto for rigidly attaching the lower end portion of the strut tower 34 to the vehicle. At the rearward side surface 34" of the strut tower 34 (and at its forward side surface) an edge portion 52' of the trunk floor member 52 is welded to the strut tower.

In FIG. 7, a cross section of the trunk floor pan 50 and the passenger compartment floor panel 52 are illustrated. The abutting edges of the panels 50, 52 are overlapped in a laterally extending seam joint 62 and are welded together. This overlapping joint 62 is also welded to a centralized divider web 64 of the cross beam 54. These welds are spaced laterally along the joint which extends between the two strut towers 32, 34. The floor pans 50 and 52 are also welded to the upper and outwardly flared flange portions 66 and 68 of the lower cross beam 54, respectively. This forms a rigid enclosed structure providing a pair of enclosed channels 54' and 54". This composite structure greatly increases the strength of the cross beam and also increases its load bearing capacity while reducing the extent of any extended and flat unsupported floor.

Figure 9:
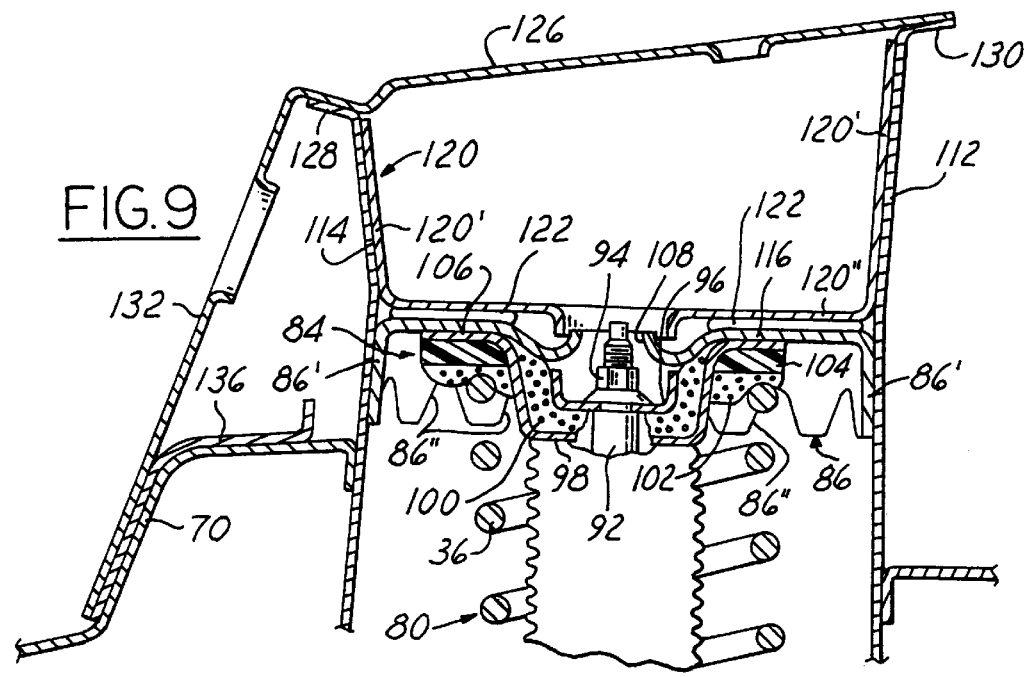
FIG. 9 is a cross sectional view taken along sight lines 9–9 of FIG. 3.
Figure 10:
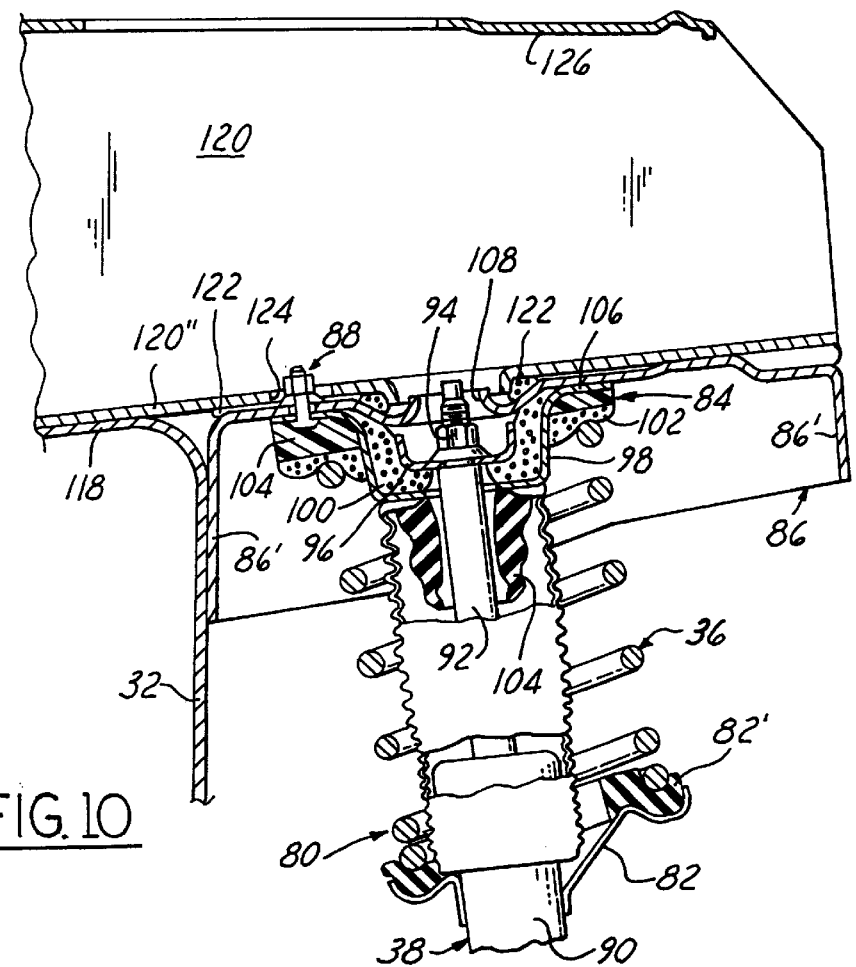
FIG. 10 is a cross sectional view taken along sight lines 10—10 of FIG. 3.

Each of the strut towers 32, 34 are attached by welds to the respective side rail 42 or 44 at a position adjacent to where cross beam member 54 is attached to the side rails. Also, this attachment location is close to where the aforementioned lateral location link of the rear suspension is attached to the suspension carrier assembly. The strut towers 32, 34 extend upwardly in a substantially vertical direction from their attachment to the side rails. As best seen in FIGS. 3 and 4, a pair of wheel-house forming assemblies 70 and 72 are attached to respective left and right side strut towers 32, 34 and to the left and right side rails 42, 44. Each of the wheel-house forming assemblies 70 and 72 may actually consist of a forwardly located piece 70', 72' and a rearwardly located piece 70", 72". An edge portions 74 of each of the wheel-house assemblies 70, 72 and an edge portion 76 of floor panels 50, 52 are welded to a respective strut tower 32, 34. Each wheel-housing assembly 70, 72 and an associated strut tower 32, 34 form a shell-like configuration which is open in the outboard direction of the vehicle to receive vehicle suspension components for each wheel. The primary suspension component is a suspension strut 80 which basically combines a coil suspension spring 36 and a shock absorber 38 as seen in FIGS. 3, 9, and 10.

Typical suspension struts 80 are of the "McPherson" type which include a compression acting, coil-type spring 36 which encircles a shock absorber 38. The spring 36 is seated at its lower end by a bracket assembly 82 attached to the outer tube of the shock absorber 38. The bracket assembly 82 also includes an annular shaped cushion member 82' of stiff but relatively flexible elastomeric material. As best shown in FIGS. 9 and 10, the suspension spring 36 extends upwards from lower bracket 82 to an upper seat formed by a mount assembly 84. Details of the mounting arrangement will be described more particularly hereinafter. The upper mount assembly 84 is secured to an inverted, generally cup-shaped cap member 86 by a plurality of stud and nut fasteners 88 (only one shown in FIG. 10). The cap member 86 includes downwardly turned edge portions 86' formed by deep drawing a flat metal plate. The edge portion 86' has several carved-out portions 86" which are formed prior to deep drawing the cap member to prevent buckling of the edge so that a relatively smooth edge can be obtained which overlie the walls of the associated strut tower (32, 34) and is welded thereto in several places.

The shock absorber portion 38 of strut 80 has a piston (not shown) reciprocally mounted within its housing 90 as is conventional for such components. The piston is attached to a rod 92 which extends out from the tubular shock absorber housing 90. An upper end of the rod 92 is connected to mount assembly 84 by a threaded nut fastener 94. More specifically, this upper end portion of the rod is threaded and the nut 94 is threadably attached thereto. A lower face portion of the nut 94 bears against a washer-like member 96 which is a part of the mount assembly 84. The member 96 is spaced from another cup-shaped member or outer mount bracket 98 by cushioning and vibration dampening material 100. Further, the upper end portion of spring 36 engages an annular shaped member 102 formed of stiff but flexible elastomeric material. A back-up member 104 of relatively rigid elastomeric material is molded to the flange portion 106 of the mounting bracket member 98. Finally, a central opening 108 is formed through the cap member 86 to provide access to the nut 94 primarily for service of the strut 80.

Referring to FIG. 4, a yoke-like configuration 110 is formed at the upper portion of each strut tower 32, 34. The yoke 110 is primarily formed between a pair of upwardly extending and spaced side wall portions 112, 114 of the strut tower itself. Referring to FIGS. 9 and 10, it can be seen that the yoke 110 is also defined by a horizontally extending upper wall 116 of the cap member 86 and a horizontally extending and oriented formed portion 118 of the strut towers 32, 34. The yoke defining side walls 112, 114 of each strut tower 32, 34 are spaced so as to closely receive an end portion of an upper cross beam member 120. The upper cross beam member 120 has a generally U-shaped configuration as viewed in cross section and illustrated in FIG. 9. Note that elastic material 122 is located between the upper surface of the cap member 86 and the lower surface of the upper cross beam 118 for dampening any vibrations that the cap member receives from the suspension which is thereby not transmitted to the cross beam. Also, note in FIG. 10 that the fasteners 88 attaching the strut assembly mounting bracket 82 to the cap member 86 does not engage the cross beam 120. An enlarged opening 124 in the bottom wall 120" prevents contact between the fasteners 88 and the cross beam 120 and therefore isolates the cross beam 120 from the strut 80.

For installation and assembly of the vehicle, the lower end portions of the strut towers 32, 34, the side rails 42, 44, the floor pans 50, 52, and the ends of the lower cross beam 54 are accurately positioned and welded to form a solid lower base for the vehicle rear portion. Next, the upper cross beam 120 is positioned relative to the upper portions of the strut towers. Specifically, the end portions of the upper cross beam 120 are placed or "floated" through respective yoke portions 110 located at the upper end of a respective strut tower 32, 34. Each yoke portion is primarily defined between upwardly extending and spaced side walls 112, 114 of the strut tower. The upper cross beam is fixtured to position it correctly with respect to the vehicle frame or platform. Then, the upper ends of the strut towers 32, 34 are aligned correctly both vertically and in parallelism relative to one another. Next, the side walls 112, 114 of the yoke 110 are spot welded to the side walls 120' of the upper cross beam 120 at a plurality of locations. Further, a plurality of welds attach the lower wall portion 120" of cross beam 120 to the inwardly directed portion 118 of the strut tower itself. Especially, the many spot welds between the yoke's side walls 112, 114 and the walls 120' of the upper cross beam 120 are spaced apart an extend laterally across a substantial distance of the overlying walls 112, 114, and 120'. This creates a particularly strong joint therebetween to inhibit any substantial movement between the strut tower and the upper cross beam. It should be noted that this very rigid and strong joints or connections between the members 32, 32 and the ends of the cross beam 120 is accomplished without any addition of gusset members or other auxiliary bracing members which would add weight, increase assembly complexity, introduce paths for errors in alignment, and take-up space in the interior framed by the strut towers, floor, and upper cross beam.

The above described assembly process greatly enhances quantity build of the vehicle as even very minor dimensional variations can be corrected before the final fixing of the strut towers. These seemingly minor variations may result in significant strut tower to strut tower misalignments. With this construction the strut towers are very accurately aligned and matched to the ends of the upper cross beam so that force moments associated with the upper beam are also reduced.

Figure 8:
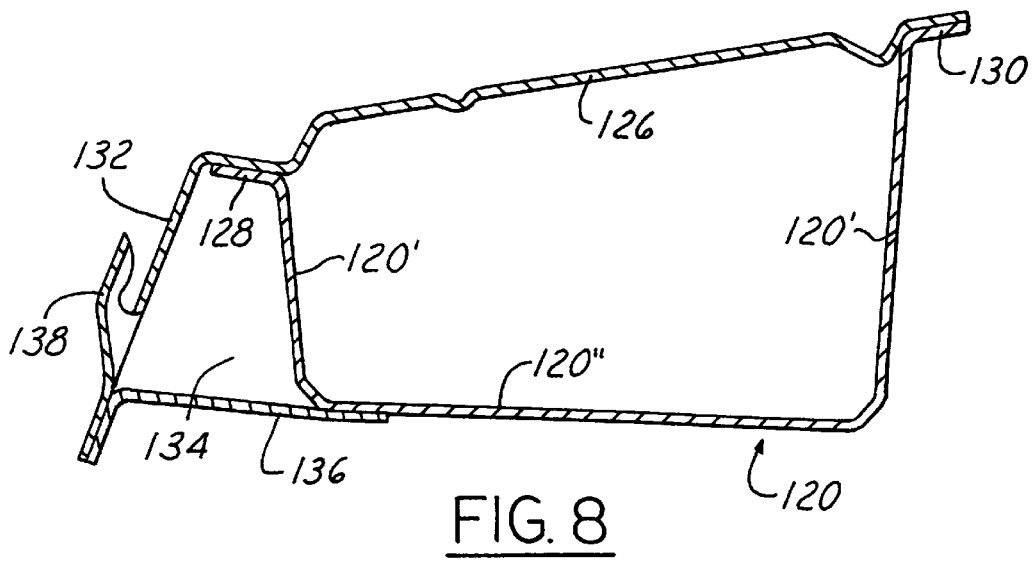
FIG. 8 is a cross sectional view taken along sight lines 8–8 of FIG. 3.

The open top portion of the upper cross beam 120 is closed and therefore strengthened by welding a shelf panel member 126 thereto. Specifically, a pair of outwardly flared flanges 128 and 130 of the upper cross beam 120 are welded to the edges of the shelf panel 126. As shown best in FIG. 8, the upper cross beam 120 is further strengthened by its attachment to a forwardly and downwardly extending portion 132 of the top shelf panel 126. Portion 132 in turn is welded to the wheel-housing 70. This provides a laterally extending cell or section 134 which is closed by a lower panel member 136 welded to the lower web of the upper cross beam 120 and to a forward portion of the top shelf panel 126. This closed section 107 augments the strength of the upper cross beam 120 and provides longitudinal support for the upper portion of the rear seat back. Referring to the seat back, the hook-shaped configuration 138 in FIG. 8 is used to support the associated seat back.

When the lower and the upper cross beams 54, 120 are rigidly attached to the lower and the upper portions of the suspension struts towers 32, 34 and floor pans 50 and 52, a generally continuous or closed type loop structure is created for the rear framing structure. Also, the operative relationship between the closed type loop structure and the longitudinally extending side rails provides a very rigid platform for rear suspension components. The assembly has a substantially increased beam strength compared to previous framing structures. It resists bending moments caused by input into this structure by the wheels and suspension struts including substantial side loads resulting from vehicle operations on rough, pothole-cratered road surfaces.

More specifically, referring to the upper mounting assembly for rear suspension components, the strut mount assembly 84 and cap member 86 are isolated from the beam structure of the vehicle by a cushion of elastomeric material 122. Specifically, a suitable elastomer material may be injected in the desired space and subsequently cured to serve as dampening agents for suspension vibrations transmitted to the strut cap. Further, the end of the shock absorber rod 92 is attached to a member 96 which itself is isolated from the strut mounting member 98 by the sufficiently rigid yet resilient elastomeric material 100. Further, a tubular jounce bumper 140 of rubber material is carried by the rod 92 and extends downward toward the upper end portion of the shock housing 90. When the shock absorber is fully compressed such as by the wheel engaging a raised portion of the road, the rubber jounce bumper 140 engages the top of the shock absorber housing and is distorted so as to cushion the shock of such shock absorber action.

From the above, it will be understood this invention provides a rigid rear suspension mounting frame assembly which reaches an improved standard for frame stiffness, strength and quietness while also providing and improving provision for a cargo pass-through from the trunk into the back seat compartment of the passenger compartment.

While a preferred embodiment of the invention has been shown and described, other embodiments will now become apparent to those skilled in the art. Accordingly, this invention is not to be limited to that which is shown and described but by the following claims.

What is claimed is:

1. In an assembly of a rigid framing structure for supporting rear suspension components of a vehicle of the type having a pair of generally vertically oriented strut towers spaced laterally across the vehicle, an elongated lower cross beam extending across the vehicle in a lateral direction for operably connecting lower extremities of the strut towers together, and an elongated upper cross beam having opposite end portions and extending across the vehicle in a lateral direction for engaging upper portions of the strut towers, each end portion of the upper cross beam having a pair of spaced apart side walls, a method for positioning and aligning the strut towers in substantial parallelism with one another and relative to the vehicle, the method comprising:

providing an upper portion of each strut tower having a pair of spaced apart sidewalls, each of said spaced apart sidewalls extending substantially in lateral planes across the vehicle;

forming a yoke configuration at the upper portion of each strut tower between each pair of said spaced apart sidewalls such that the spacing between the pair of spaced apart sidewalls is sufficient to receive one of the end portions of the upper cross beam;

placing the upper cross beam between the spaced strut towers laterally across the vehicle with each end portion of the upper cross beam engaging one yoke configuration of the strut towers respectively, such that each of the end portion of the upper cross beam's spaced apart side walls extend adjacent to one of the strut tower's pair of spaced apart sidewalls which define the adjacent walls of the yoke configuration;

adjustably positioning the upper portions of the strut towers for alignment relative to one another as permitted by movements between the walls of the yoke configuration relative to the side walls of the end portions of the upper cross beam;

attaching respective wall portions of the yoke configurations to adjacent side walls of the end portions of the upper cross beam to fix the aligned positioning of the strut towers.

2. The method set forth in claim 1 wherein, during positioning of the strut towers, the two pairs of walls defining the yoke configuration and the two side walls of the end portions of the upper cross beam slide relative to one another in lateral directions.

3. The method set forth in claim 1 wherein, after positioning and aligning of the strut towers, the adjacent walls of the yoke configuration and the side walls of the end portions of the upper cross beam are attached together.

4. The method set forth in claim 3 wherein, a plurality of spaced apart spot welds attaches the adjacent walls of the yoke configuration and the side walls of the end portions of the upper cross beam.

5. The method set forth in claim 4 wherein, the plurality of spot welds are formed between one of the sidewalls of the yoke configuration and one of the spaced apart sidewalls of the end portion of the upper cross beam, in a pattern extending substantially in the lateral direction of the vehicle and substantially in a vertical direction thereby providing a rigid connection over a substantial length of the attached walls.

\* \* \* \* \*